(12) United States Patent
Beisele

(10) Patent No.: US 9,558,868 B2
(45) Date of Patent: Jan. 31, 2017

(54) USE OF HYDROPHOBIC EPOXIDE RESIN SYSTEM FOR ENCAPSULATION OF A INSTRUMENT TRANSFORMER

(75) Inventor: Christian Beisele, Mullheim (DE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 343 days.

(21) Appl. No.: 14/238,491

(22) PCT Filed: Jun. 26, 2012

(86) PCT No.: PCT/EP2012/062349
§ 371 (c)(1),
(2), (4) Date: Feb. 12, 2014

(87) PCT Pub. No.: WO2013/029831
PCT Pub. Date: Mar. 7, 2013

(65) Prior Publication Data
US 2014/0205843 A1 Jul. 24, 2014

(30) Foreign Application Priority Data
Aug. 31, 2011 (EP) .................................... 11179502

(51) Int. Cl.
*B32B 27/38* (2006.01)
*H01B 19/04* (2006.01)
*C08L 63/00* (2006.01)
*H01B 3/40* (2006.01)
*H01B 3/46* (2006.01)
*H01B 3/42* (2006.01)

(52) U.S. Cl.
CPC ............... *H01B 19/04* (2013.01); *C08L 63/00* (2013.01); *H01B 3/40* (2013.01); *H01B 3/427* (2013.01); *H01B 3/46* (2013.01); *Y10T 428/31511* (2015.04)

(58) Field of Classification Search
CPC ........... C08L 63/00; H01B 3/40; H01B 3/427; H01B 19/04; H01B 3/46; Y10T 428/31511
USPC ........................................................ 428/413
See application file for complete search history.

(56) References Cited

U.S. PATENT DOCUMENTS 6,225,376 B1 * 5/2001 Klein .................... C08G 59/066
523/404
6,764,616 B1 * 7/2004 Beisele .................... C08L 63/00
252/500

FOREIGN PATENT DOCUMENTS

EP       0899304     3/1999
WO       00/34388    6/2000

* cited by examiner

*Primary Examiner* — Eisa Elhilo
(74) *Attorney, Agent, or Firm* — Huntsman International LLC

(57) ABSTRACT

Disclosed is the use of a curable composition for padding-free encapsulation of instrument transformers comprising (a) a cycloaliphatic epoxy resin, (b) a polyoxyalkylene diglycidylether (c) an OH-terminated polysiloxane, (d) a cyclic polysiloxane and (e) a non-ionic, fluoroaliphatic surface-active reagent, (f) a filler, (g) a hardener selected from anhydrides, (h) a curing accelerator selected from accelerators for anhydride curing of epoxy resins.

14 Claims, No Drawings

USE OF HYDROPHOBIC EPOXIDE RESIN SYSTEM FOR ENCAPSULATION OF A INSTRUMENT TRANSFORMER

CROSS REFERENCE TO RELATED APPLICATIONS

This application is the National Phase of International Application PCT/EP2012/062349 filed Jun. 26, 2012 which designated the U.S. and which claims priority to European Patent Application (EP) 11179502.7, filed Aug. 31, 2011. The noted application is incorporated herein by reference.

The present invention relates to the use of a specific composition for padding-free encapsulation of instrument transformers and to a method for encapsulation of such instrument transformers.

Epoxy resins are frequently used as electrical insulating material on account of their good mechanical properties and their high specific resistance. Encapsulation of instrument transformers with epoxy resins has been hampered by the fact that epoxy resins are rather rigid housing material. High mechanical stresses are typically imposed on the housing material, especially when the units are exposed to extreme temperature conditions due to thermal expansion mis-match between the assembly components and the encapsulant material. In order to avoid cracks in the epoxy resin housing and to avoid pressure on the core of the instrument transformer due to shrinkage of the encapsulant material, the pressure sensitive parts (e.g. iron cores) of the instrument transformers, which are critical for the measurement accuracy, are usually padded with a soft plastic material, e.g. a rubber tape or crepe paper or a semi-conductive material with high elongation. In some designs the stress sensitive part of an instrument transformer is kept in a gas filled box in order to avoid direct contact with the encapsulation material before the epoxy resin for the housing is applied. However, padding is an extra work step and economically disadvantageous and in addition is technically challenging, as the formation of voids must be avoided: voids can lead to partial glow discharges within the high voltage windings which would damage the instrument transformer. Therefore, padding-free transformers were developed, as exemplified in DE 37 02 782 which mostly use a rubber-like silicone elastics with a shore A hardness of 25 to 98 as housing material. However, silicone compounds are rather expensive. Although flexible, they are weak in mechanical performance. Additionally, it was found that liquid silicones that might be suitable for this purpose are less resistant towards outdoor salt fog conditions.

There was a need for a technically and economically more feasible process. Surprisingly, it was found that certain semi-flexible epoxy resin compositions can be used to provide padding free instrument transformers.

Similar epoxy resin compositions are known from WO 00/34388, the disclosure of which is hereby included by reference. These epoxy compositions have been used for a number of years as encapsulation materials. However, it was completely surprising to the person skilled in the art that compositions based on those disclosed in WO 00/34388 could be used to manufacture transformers without padding materials.

It has now been found that compositions comprising two different an epoxy resins, at least two specific polysiloxanes and a non-ionic, fluoroaliphatic surface-active reagent, a filler, hardener and curing accelerator can be used to manufacture padding free instrument transformers.

The present invention relates to the use of a curable composition for padding-free encapsulation of instrument transformers comprising (a) a cycloaliphatic epoxy resin, (b) a polyoxyalkylene diglycidyl ether, (c) an OH-terminated polysiloxane, (d) a cyclic polysiloxane and (e) a non-ionic, fluoroaliphatic surface-active reagent, (f) a filler, (g) a hardener selected from anhydrides, (h) a curing accelerator selected from accelerators for anhydride curing of epoxy resins.

In a preferred embodiment of the invention, a composition is used that comprises: (a) 3 to 40% b.w. of a cycloaliphatic epoxy resin; (b) 3 to 40% b.w. of a polyoxyalkylene diglycidylether (c) 0.3 to 10% b.w. of an OH-terminated polysiloxane, (d) 0.3 to 10% b.w. of a cyclic polysiloxane and (e) 0.01 to 1% b.w. of a non-ionic, fluoroaliphatic surface-active reagent, (f) 1 to 80% b.w. of a filler, (g) 4 to 25% b.w. of a hardener selected from anhydrides, (h) 0.1 to 2% b.w. of a curing accelerator selected from accelerators for anhydride curing of epoxy resins, based on the total weight of the composition. In a more preferred embodiment, the composition used comprises (a) 10-15% b.w. of a cycloaliphatic epoxy resin; (b) 10-15% b.w. of a polyoxyalkylene diglycidylether (c) 1-2%, b.w. of an OH-terminated polysiloxane, (d) 1-3% b.w. of a cyclic polysiloxane and (e) 0.1-0.7% b.w. of a non-ionic, fluoroaliphatic surface-active reagent, (f) 15-70% b.w. of a filler, (g) 5%-30% b.w. of a hardener selected from anhydrides, (h) 0.2-1% b.w. of a curing accelerator selected from accelerators for anhydride curing of epoxy resins. Even more preferably the composition used comprises (a) 5-20% b.w. of a cycloaliphatic epoxy resin; (b) 5-20% b.w. of a polyoxyalkylene diglycidylether; (c) 1-2% b.w. of an OH-terminated polysiloxane; (d) 1-3% b.w. of a cyclic polysiloxane; (e) 0.1-0.2% b.w. of a non-ionic, fluoroaliphatic surface-active reagent; (f) 40-60% b.w. of a filler, (g) 10-20% b.w. of a hardener selected from anhydrides, (h) 0.3%-0.4% b.w. of a curing accelerator selected from accelerators for anhydride curing of epoxy resins. Most preferred is the use of a composition comprising (a) 5-20% b.w. of hexahydrophthalic acid diglycidyl ester; (b) 5-20% b.w. of a polypropylene glycole diglycidylether; (c) 1-2% b.w. of an OH-terminated polydimethylsiloxane; (d) 1-3% b.w. of a cyclic polysiloxane comprising $Si_6O_6$ and $Si_8O_8$ units and; (e) 0.1-0.2% b.w. of a non-ionic, fluoroaliphatic surface-active reagent selected from fluoroaliphatic esters, fluoroaliphatic alkoxylated alcohols and fluoroaliphatic sulfonamides; (f) 40-60% b.w. of a filler comprising silica flour and aluminumtrihydroxide, (g) 10-20% b.w. hexahydrophthalic acid anhydride, (h) 0.3%-0.4% b.w. of a curing accelerator selected from imidazole curing accelerators.

The compositions can additionally comprise optional components, such as wetting agents, defoamers, color agents, silane coupling agents and other additives typical in epoxy chemistry. The new use of these epoxy resin compositions allows to save in production costs when manufacturing instrument transformers. It provides a semi-flexible coating with less stiffness, good erosion resistance, bird pick resistance, and good salt fog performance, which offers the great advantage that it can be used without any additional padding material.

The weight ratio of (a):(b) is selected in such a way that the resulting Tg of the cured composition is between 0-40° C. The person skilled in the art is well aware how to select and adjust these ratios. The weight ratio of (a) to (b) preferably ranges between 30:70 and 70:30, more preferably 40:60 and 60:40 and most preferably is around 1:1.

The amount of filler in the total composition is such that the mixture has a flowabilty which is sufficient to cast into the instrument transformer mold. This usually means that it has to have a viscosity of 0.1 bis 10 Pas at 60° C. (ISO 12058; viscosimeter Rheomat 300; measuring system MS DIN 125; shear rate 10/s). The filler content typically ranges between 15-70%, preferably from 40-60% and most preferably 45-55%.

Component (a)

Component (a) of the present invention are cycloaliphatic epoxy resins. The term "cycloaliphatic epoxy resin" in the context of this invention denotes any epoxy resin having cycloaliphatic structural units, that is to say it includes both cycloaliphatic glycidyl compounds and β-methylglycidyl compounds as well as epoxy resins based on cyclo-alkylene oxides.

Suitable cycloaliphatic glycidyl compounds and β-methylglycidyl compounds are the glycidyl esters and β-methylglycidyl esters of cycloaliphatic polycarboxylic acids, such as tetrahydrophthalic acid, 4-methyltetrahydrophthalic acid, hexahydrophthalic acid, 3-methylhexahydrophthalic acid and 4-methylhexahydrophthalic acid.

Further suitable cycloaliphatic epoxy resins are the diglycidyl ethers and β-methylglycidyl ethers of cycloaliphatic alcohols, such as 1,2-dihydroxycyclohexane, 1,3-dihydroxycyclohexane and 1,4-dihydroxycyclohexane, 1,4-cyclohexanedimethanol, 1,1-bis(hydroxymethyl)cyclohex-3-ene, bis(4-hydroxycyclohexyl)methane, 2,2-bis(4-hydroxycyclohexyl)propane and bis(4-hydroxycyclohexyl) sulfone.

Examples of epoxy resins having cycloalkylene oxide structures are bis(2,3-epoxycyclopentyl)ether, 2,3-epoxycyclopentylglycidyl ether, 1,2-bis(2,3-epoxycyclopentyl)ethane, vinyl cyclohexene dioxide, 3,4-epoxycyclohexylmethyl-3',4'-epoxycyclohexanecarboxylate, 3,4-epoxy-6-methylcyclohexylmethyl 3',4'-epoxy-6'-methylcyclohexanecarboxylate, bis(3,4-epoxycyclohexylmethyl)adipate and bis(3,4-epoxy-6-methylcyclohexylmethyl)adipate.

Preferred cycloaliphatic epoxy resins are bis(4-hydroxycyclohexyl)methane diglycidyl ether, 2,2-bis(4-hydroxycyclohexyl)propane diglycidyl ether, tetrahydrophthalic acid diglycidyl ester, 4-methyltetrahydrophthalic acid diglycidyl ester, 4-methylhexahydrophthalic acid diglycidyl ester.

Especially preferred according to the invention is the use of hexahydrophthalic acid diglycidyl ester or a combination of hexahydrophthalic acid diglycidyl ester with an aliphatic epoxy resin. The latter are discussed in more detail below and are based on epoxidation products of natural oils.

The cycloaliphatic epoxy resins are used in an amount of 3-40% b.w., preferably 5-20% b.w., and more preferably 10-15% b.w. based on the total weight of the curable composition.

In another embodiment if the invention it is preferred to use a combination of the cycloaliphatic epoxy resins, mentioned above, with aliphatic epoxy resins. Preferred aliphatic epoxy resins are epoxidation products of unsaturated fatty acid esters. It is preferable to use epoxy-containing compounds derived from mono- and poly-fatty acids having from 12 to 22 carbon atoms and an iodine number of from 30 to 400, for example lauroleic acid, myristoleic acid, palmitoleic acid, oleic acid, gadoleic acid, erucic acid, ricinoleic acid, linoleic acid, linolenic acid, elaidic acid, licanic acid, arachidonic acid and clupanodonic acid. Suitable are the epoxidation products of soybean oil, linseed oil, perilla oil, tung oil, oiticica oil, safflower oil, poppy seed oil, hemp oil, cottonseed oil, sunflower oil, rapeseed oil, poly-unsaturated triglycerides, triglycerides from euphorbia plants, groundnut oil, olive oil, olive kernel oil, almond oil, kapok oil, hazelnut oil, apricot kernel oil, beechnut oil, lupin oil, maize oil, sesame oil, grapeseed oil, lallemantia oil, castor oil, herring oil, sardine oil, menhaden oil, whale oil, tall oil and derivatives thereof. Also suitable are higher unsaturated derivatives that can be obtained by subsequent dehydrogenation reactions of those oils. The olefinic double bonds of the unsaturated fatty acid radicals of the above-mentioned compounds can be epoxidised in accordance with known methods, for example by reaction with hydrogen peroxide, optionally in the presence of a catalyst, an alkyl hydroperoxide or a per acid, for example performic acid or peracetic acid. Within the scope of the invention, both the fully epoxidised oils and the partially epoxidised derivatives that still contain free double bonds can be used as component (a) in combination with the cycloaliphatic epoxy compounds. Especially preferred as component (a) are epoxidised soybean oil and epoxidised linseed oil.

Component (b)

Component (b) is a polyoxyalkylene diglycidyl ether. Preferred polyoxyalkylene diglycidyl ethers are linear or branched polyoxyethylene diglycidyl ethers, polyoxypropylene diglycidyl ethers or polytetrahydrofurane diglycidylether. The number of oxyalkylene units can range between 3-100 and preferably ranges between 5-50, more preferably between 5-10. A most preferred polyoxyalkylene diglycidyl ether has an average of 7 oxyalkylene units. According to the invention, a mixture of different polyoxyalkylene diglycidyl ethers can be used as well.

A preferred polyoxyalkylen diglycidyl ether is Araldite® DY 3601, sold by Huntsman.

Component (b) is used in an amount of 3-40% b.w., preferably 5-20% b.w., and more preferably 10-15% b.w. based on the total weight of the curable composition.

Component (c)

Component (c) is an OH-terminated polysiloxane which can be prepared according to known methods, for example by hydrolysis of the corresponding organochlorosilanes and subsequent polycondensation of the silanols. The polysiloxane mixtures obtained this way usually have molecular masses ranging between 1000 and 150000 g/mol. A variety of such OH-terminated polysiloxanes are commercially available.

The compositions used according to the present invention preferable comprise a liquid (at 23° C.) polydimethylsiloxane. Preferred are polydimethylsiloxanes having a viscosity of 4000-8000 mPa·s at a temperature of 23° C. (DIN 53018), preferably 5000-7000 mPa·s and most preferably 5500-6500 mPa·s.

Preferably composition are used which comprise a polysiloxane of formula I

(I)

wherein $R_1$ and $R_2$ are each independently of the other $C_1$-$C_{18}$ alkyl, $C_5$-$C_{14}$ aryl or $C_6$-$C_{24}$-aralkyl and n is an average value ranging from 3 to 150, preferably from 30 to 120, more preferably 30-100 and most preferably 30-50.

Alkyl includes, for example, methyl, ethyl, isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Aryl as $R_1$ or $R_2$ contains preferably from 6 to 14 carbon atoms and can for example be phenyl, tolyl, pentalinyl, indenyl, naphthyl, azulinyl and anthryl.

Aralkyl as $R_1$ or $R_2$ contains preferably from 7 to 12 carbon atoms and especially from 7 to 10 carbon atoms. Examples are benzyl, phenylethyl, 3-phenylpropyl, α-methylbenzyl, 4-phenylbutyl or α,α-dimethylbenzyl.

Special preference is given to polysiloxanes of formula I wherein $R_1$ and $R_2$ are each independently of the other methyl, ethyl or phenyl.

Most preferred as component (b) are polysiloxanes of formula I wherein $R_1$ and $R_2$ are methyl and n=4 to 20. An example of such a suitable polysiloxane is Polymer FD 6 sold by Wacker-Chemie.

Component (c) is used in an amount of 0.3-10% b.w., preferably 0.5-3% b.w., and more preferably 1-2% b.w. based on the total weight of the curable composition.

Component (d)

The cyclic polysiloxane, component (d), are likewise known to the person skilled in the art and can be prepared according to known methods.

It is preferred to use of a composition which comprises as component (d) a cyclic polysiloxane of formula II

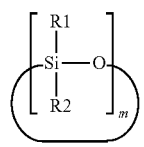

(II)

wherein $R_1$ and $R_2$ are each independently of the other $C_1$-$C_{18}$ alkyl, $C_5$-$C_{14}$ aryl or $C_6$-$C_{24}$-aralkyl and m is an integer from 3 to 12.

Alkyl, aryl and aralkyl in formula (II) have the same definitions as the corresponding groups according to formula (I). Preferred as component (c) are cyclic polysiloxanes of formula II wherein $R_1$ and $R_2$ are each independently of each other methyl, ethyl or phenyl and m is an integer from 3 to 8. In a preferred embodiment, $R_1$ and $R_2$ are methyl and m is an integer ranging between 6 and 8.

Such cyclic polysiloxanes can be isolated from the product mixture formed on hydrolysis of the corresponding dialkyl-, diaryl- or diaralkyl-dichlorosilanes.

In an especially preferred embodiment component (d) is selected from octamethylcyclotetrasiloxane (m=4), decamethylcyclopentasiloxane (m=5) and especially dodecamethylcyclohexasiloxane (m=6) and also hydrolysates of dimethyldichlorosilane. It is preferred to use undistilled hydrolysates, since they have a higher content of cyclic polysiloxanes having the preferred ring size m=6 to 8, i.e. dodecamethylcyclohexasiloxane, tetradecamethylcycloheptasiloxane (m=7) and hexadecamethylcyclooctasiloxane (m=8).

Component (d) is used in an amount of 0.3-10% b.w., preferably 0.5-5% b.w., and more preferably 1-3% b.w. based on the total weight of the curable composition.

Component (e)

Component (e) according to the present invention are fluoroaliphatic surface active agents. Suitable derivatives are non-ionic, fluoroaliphatic polyoxyalkylenes. Preference is given to compounds comprising a perfluorinated aliphatic alkyl unit $R_f$ and a hydrocarbon unit R, in which the latter contains at least one, preferably oxygen-containing, mono- or divalent polar functional group, e.g. —OH, —COOH, —COOR, —COO—, —CO—, —O—.

In a preferred embodiment according to the present invention, component (e) is a non-ionic, fluoroaliphatic surface-active reagent selected from fluoroaliphatic esters, fluoroaliphatic alkoxylated alcohols and fluoroaliphatic sulfonamides. For the purpose of this invention, the latter also include components with a fluoroaliphatic sulfonamide containing structural unit in the molecule.

Suitable compounds are alkoxylated, especially ethoxylated, fatty acid derivatives comprising a perfluorinated alkyl moiety as a terminal or non-terminal substituent. Preferred are components exemplified by the following formulae:

 (III)

 (IV)

 (V)

wherein m=1 to 200; $R_f$ is a linear or branched perfluorinated alkyl moiety having from 2 to 22 carbon atoms; $R_1$=H, $C_1$-$C_6$ alkyl or $R_f$; $R_2$=H, $C_1$-$C_6$ alkyl; $R_3$=—(CH$_2$)$_2$—O—CO—CH=CH$_2$ or $R_2$ or —CH$_2$—CH$_2$—OH.

Preferred compounds are also telomers of (V) with 3-mercapto-1,2-propanediol which are further reacted with 2-methyloxirane and oxirane di-2-propenoate to give compounds such as the one registered according to CAS Nr. 1017237-78-3, commercially available under the name Novec™ FC 4430 through 3M.

A structure according to formula (V) is for example:

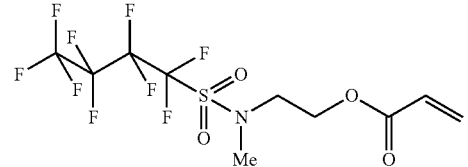 [SMILES: C=CC(=O)OCCN(C)S(=O)(=O)C(F)(F)C(F)(F)C(F)(F)C(F)(F)F]

It is preferable to use compounds of formula (III) or (IV) in which the molecular mass according to the theoretical empirical formula ranges between 200 to 10000, especially from 300 to 8000. Most preferred is the use of Novec™ FC 4430.

Preferred compounds are, for example, $F_3C$—$(CF_2)_5$—$(CH_2CH_2O)$—H i.e. 1,1,2,2-tetrahydro-perfluorooctanol (corresponding to formula IV, wherein $R_f$=perfluorinated n-hexyl, m=1 and R=H) or $R_f$—COO—$(CH_2CH_2O)_m$—R, wherein $R_f$ is a linear perfluorinated alkyl having from 16 to 18 carbon atoms, m=110-130 and R=H.

Some of those compounds are commercially available from a number of sources, e.g. as ZONYL® Fluorochemical Intermediates (DuPont), e.g. ZONYL® BA-L and BA Fluoro-alcohols, or FLUORAD® Fluorosurfactants (3M), e.g. FLUORAD® FC431 and Novec™ Fluorosurfactant FC 4430. Further surface-active compounds suitable for use according to the invention can be found in the technical bulletins/data sheets of the manufacturers mentioned above; technical information relating to Zonyl is found in the technical data sheets provided by DuPont on the Internet: i.e. Zonyl® FS 100 or Zonyl® FSO.

According to the present invention one or more compound(s) of each component (a) to (e) can be used in the compositions.

Component (e) is used in an amount of 0.01-1% b.w., preferably 0.1-0.7% b.w., and more preferably 0.1-0.2% b.w. based on the total weight of the curable composition.

Component (f)

The curable compositions used to make padding-free transformers according to the present invention also comprise fillers as component (f). These can be various: metal powder, wood flour, glass powder, glass beads, semi-metal and metal oxides, such as $SiO_2$ (quartz sand, quartz powder, silanised quartz powder, fused silica powder, silanised fused silica powder), aluminium oxide, titanium oxide and zirconium oxide, metal hydroxides, such as $Mg(OH)_2$, $Al(OH)_3$, silanised $Al(OH)_3$ and $AlO(OH)$, semi-metal and metal nitrides, for example silicon nitride, boron nitrides and aluminium nitride, semi-metal and metal carbides (SiC and boron carbides), metal carbonates (dolomite, chalk, $CaCO_3$), metal sulfates (barite, gypsum), ground minerals, e.g. of hydromagnesite and huntite, and natural or synthetic minerals chiefly of the silicate series, e.g. zeolites (especially molecular sieves), talcum, mica, kaolin, wollastonite and others. Preferred fillers are quartz powder, silanised quartz powder, silicic acid, aluminium hydroxide and aluminium oxide. Component (f) is used in quantities of 1-80 wt.-% based on the total weight of the curable composition, more preferably 15-70 wt.-% and most preferably 40-60 wt.-%. The filler preferably also comprises auxiliaries which result in a thixotropic effect, like highly dispersed fumed silica. Highly dispersed, hydrophilic, untreated silicic acids are especially suitable. They are commercially available, for example in the form of Aerosil®. The effective amounts of fumed silica are in the range of from 0.01 to 3.5% by weight, preferably from 0.05 to 3.0% by weight, based on the sum of components (a) to (d), and the average size of the primary particles is advantageously about 7-20 nm. According to the present invention, it is most preferable to use a combination of silica flour and aluminium trihydroxide, $Al(OH)_3$.

Component (g)

According to the present invention the hardeners used in the curable compositions as component (g) are anhydride hardeners.

Such an anhydride may be a linear aliphatic polymeric anhydride, for example polysebacic polyanhydride or polyazelaic polyanhydride, or a cyclic carboxylic anhydride.

Fully saturated cyclic carboxylic anhydrides are especially preferred according to the present invention. These are preferred for outdoor applications, where unsaturated anhydrides could not used.

Examples of cyclic carboxylic anhydrides are: succinic anhydride, citraconic anhydride, itaconic anhydride, alkenyl-substituted succinic anhydrides, dodecenylsuccinic anhydride, maleic anhydride and tricarballylic anhydride, a maleic anhydride adduct with cyclopentadiene or methylcyclopentadiene, a linoleic acid adduct with maleic anhydride, alkylated endoalkylenetetrahydrophthalic anhydrides, methyltetrahydrophthalic anhydride and tetrahydrophthalic anhydride, the isomeric mixtures of the two latter compounds being especially suitable. Especially preferred are hexahydrophthalic anhydride or methylhexahydrophthalic anhydride or a mixture of both.

Further examples of cyclic carboxylic anhydrides are aromatic anhydrides, for example pyromellitic dianhydride, trimellitic anhydride and phthalic anhydride.

It is also possible to use chlorinated or brominated anhydrides, e.g. tetrachlorophthalic anhydride, tetrabromophthalic anhydride, dichloromaleic anhydride and chlorendic anhydride.

Component (g) is used in an amount of 4-45% b.w., preferably 5-30% b.w., and more preferably 10-20% b.w. based on the total weight of the curable composition.

Component (h)

The compositions used according to the present invention comprise a curing accelerator (h) selected from accelerators for anhydride curing of epoxy resins. Suitable accelerators are known to the person skilled in the art. Examples that may be mentioned are: complexes of amines, especially tertiary amines, with boron trichloride or boron trifluoride; tertiary amines, such as benzyldimethylamine; urea derivatives, such as N-4-chlorophenyl-N',N'-dimethylurea (monurone); unsubstituted or substituted imidazoles, such as imidazole or 2-phenylimidazole; Mannich base type accelerators like Accelerators 2950 and 960-1 from Huntsman Advanced Materials, metal salts like hydroxides and nitrates, especially those of group I and group II metals such as calcium, lithium.

Preferred accelerators are tertiary amines, especially benzyldimethylamine, and imidazoles (e.g. 1-methylimidazole).

Another object of the present invention is a composition for padding-free encapsulation of an instrument transformer comprising (a) a cycloaliphatic epoxy resin, (b) a polyoxyalkylene diglycidylether (c) an OH-terminated polysiloxane, (d) a cyclic polysiloxane and (e) a non-ionic, fluoroaliphatic surface-active reagent, (f) a filler, (g) an anhydride curing agent, (h) a curing accelerator selected from accelerators for anhydride curing of epoxy resins.

The preferred components for the composition and their amounts are the same as those listed for the use of the composition.

Especially preferred is a composition which comprises (a) a cycloaliphatic epoxy resin selected from alkyl-substituted or unsubstituted hexahydrophthalic acid diglycidyl ester; (b) a polyoxyalkylene diglycidylether with 5-10 oxyalkylene units in a weight ratio of (a):(b) of 40:60 to 60:40; (c) an OH terminated linear polydimethyl siloxane with 10-2000 Si—O repeating units; (d) a cyclic siloxane selected dodecamethylcyclohexasiloxane, hexadecacyclooctasiloxane and hydrolysates of dimethyldichlorosilane (e) a non-ionic, fluoroaliphatic surface-active selected from esters, alkoxylated esters and alkoxylated alcohols having a perfluorinated alkyl group; (f) a filler comprising silica; (g) an anhydride curing agent selected from unsubstituted or alkyl-substituted hexahydro phthalic acid anhydride; (h) a curing accelerator selected from tertiary amines or imidazoles.

A further object of the invention is a cured composition for padding-free encapsulation of an instrument transformer obtained from curing a curable composition according to the invention.

The curing agent (g)—also called hardener—and the curing accelerator (h) are used in the customary effective amounts, that is to say amounts sufficient for curing the compositions according to the invention. The ratio of components (a) and (b) to (g) and (h) depends upon the nature of the compounds used, the rate of curing required and the properties desired in the end product and can readily be determined by the person skilled in the art. Generally, from 0.4 to 1.6 equivalents, preferably from 0.8 to 1.2 equivalents, of anhydride groups per epoxy equivalent are used.

The resin mixture (a) to (f) and the hardener mixture comprising the hardener (g) and the accelerator (h)—both comprising additional stabilizers and auxiliaries—are generally stored separately as a two component mixture and mixed together only shortly before application. If the resin mixture (a) to (f) is to be kept in interim storage prior to curing, it may require an additional auxiliary in order to keep it storage-stable. Stabilising auxiliaries may be emulsifiers and thickeners (highly disperse silicic acid and for example dibenzylidenesorbitol etc.). Such auxiliaries and their use are well known to the person skilled in the art.

Instead of hardener component together with the accelerator, the resin mixture may comprise an initiator system for the cationic polymerisation of the epoxy resin.

Furthermore, the curable mixtures according to the present invention may comprise additional tougheners, for example core/shell polymers. Suitable tougheners are described, for example, in EP 449776. They are usually used in an amount of from 1-20% by weight, based on the total amount of epoxy resin in the composition.

In addition to the additives mentioned above, the curable mixtures may also comprise further customary ingredients, e.g. antioxidants, light stabilisers, flame retardants, fillers containing water of crystallisation, plasticisers, dyes, pigments, fungicides, thixotropic agents, toughness improvers, antifoams, antistatics, lubricants, anti-settling agents, wetting agents and mould-release agents.

The compositions according to the invention can be produced in accordance with known methods using known mixing apparatus, for example stirrers, kneaders, rollers or dry mixers.

The curing of the mixtures according to the invention is carried out in a known manner in at temperatures of 60° C. to 200° C., especially from 80° C. to 180° C.

A further object is a process for encapsulating an instrument transformer in which an epoxy resin composition comprising (a) a cycloaliphatic epoxy resin, (b) a polyoxyalkylene diglycidylether, (c) an OH-terminated polysiloxane, (d) a cyclic polysiloxane and (e) a non-ionic, fluoroaliphatic surface-active reagent, (f) a filler, (g) a hardener selected from anhydrides, (h) a curing accelerator selected from accelerators for anhydride curing of epoxy resins is applied to the instrument transformer in a mold, under the proviso that no padding is used between the iron core of the transformer and the epoxy resin composition, and the encapsulated instrument transformer is subsequently cured in the mold. Preferably, the instrument transformer is encapsulated via a vacuum casting process.

Preferably, the vacuum casting involves the following conditions/steps:

a) heating a mold containing the pre-assembled padding-free instrument components to 60-100° C. and evacuating it until a pressure of ca. 5-100 mbar is reached;

b) degassing a composition according to claim 8 in vacuum c) transferring the degassed composition into the evacuated mold d) releasing the vacuum in the mold to atmospheric pressure;

e) transferring the mold to a curing oven and heating it to temperatures of 80-140° C. for 1-10 hours;

f) cooling the mold and releasing the cured, encapsulated padding-free instrument transformer.

In another preferred process, the transformer is encapsulated via an automatic pressure gelation process. Preferably, the automatic pressure gelation involves the following steps/conditions:

a) heating the pre-assembled components of the padding-free instrument transformer to temperatures of 80° C.-160° C.;

b) transferring the hot pre-assembled components of the instrument transformer to an automatic pressure gelation mold and heating this to a temperature of 100-160° C.;

c) degassing a composition according to claim 8 under vacuum at a temperature between 20° C. and 80° C.

d) injecting a composition according to claim 8 into the mold at a temperature of the mold ranging between 100-160° C.;

e) applying a pressure of ca. 1-5 bar after the mold is filled f) keeping the parts in the mold at 1-5 bar until they are fully cured and releasing them after that; or opening the mold when a degree of conversion of 90% has been reached and transferring the parts to a post cure oven for final cure.

A further object of the invention is a transformer obtained by one of the processes described above.

In the following inventive example, the following commercially available substances are used:

1) Epoxy resin 1: liquid hexahydrophthalic acid diglycidyl ester; epoxy content: 5.6 to 6.2 eq./kg; Araldite® CY 184", Supplier: Huntsman 2) Epoxy resin 2: Araldite® DY 3601; Polypropyleneglycoldiglycidylether; epoxy content: 2.5-2.8 eq./kg; Supplier: Huntsman 3) Polymer FD 6; OH-terminated polydimethylsiloxane having a viscosity of 6000 mPa·s at 23° C. (DIN: 53018); Supplier: Wacker 4) Cyclic polysiloxane: "Di-Methyl-Methanolysate"; mixture comprising cyclic polysolixanes (≥60%), especially higher cyclic polysiloxanes; and linear polysiloxanes; Supplier: Momentive Performance Chemicals 5) 3M Novec™ Fluorosurfactant FC 4430; non-ionic fluorinated additive preparation containing a surface active substance as registered under CAS Nr. 1017237-78-3

6) Silbond® W 12 EST: quartz powder pretreated with epoxysilane; Supplier: Quarzwerke Frechen 7) Apyral® 2 E (ATH=aluminum trihydroxide); Supplier: Nabaltec 8) Apyral® 60 D (ATH=aluminium trihydroxide); Supplier: Nabaltec 9) Grey color paste Araldite® DW 9134; hexahyrophthalic glycidyl ester with pigments; Supplier: Huntsman 10) Byk® E 410: solution of modified urea; rheological additive; Supplier: Byk Chemie 11) Aerosil® 200; hydrophilic fumed silica; Supplier: Evonik 12) Accelerator DY 070: 1-methyl-imidazole; Supplier: Huntsman 13) Aradur® HY 1235 BD: hexahydrophthalic anhydride and methylhexahydrophthalic anhydride; Supplier: Huntsman 14) Byk® W 9010: wetting additive and dispersing additive; copolymer with acidic groups; Supplier: Byk Chemie 15) Aerosil® R 202; hydrophobic fumed silica; Supplier: Evonik 16) Silquest® A-187 Silane; γ-glycidoxypropyl trimethoxy silane; adhesion promoter; Supplier: GE Silicones

EXAMPLES

1. Curable Composition

Example 1 (1a and 1b)

Resin Part: 1a

| Amount in grams | Components |
| --- | --- |
| 3800 | Araldite ® CY 184 |
| 100 | Silan A-187 |
| 3970 | Araldite ® DY 3601 |
| 400 | Polymer FD 6 |
| 1000 | Di-Methyl-Methanolysate |
| 50 | Novec FC 4430 |
| 100 | Byk 410 |
| 400 | Araldite ® DW 9134 |
| 180 | Aerosil ® 200 |
| 1787 | Apyral ® 60 D |

Preparation Process for Resin:

3800 g of resin CY 184, 100 g Silan A-187, 3970 g of DY 3601, OH-terminated Polydimethyl-Siloxan with a viscosity of 5000-7000 mPa·s at 23° C. (DIN 53018), 1000 g Dim-ethylmethanolysat, 50 g Novec FC 4430, 100 g Byk 410, 400 g DW 9134 are charged to a Molteni mixer equipped with an anker stirrer and a high speed disperser. The content of the vessel was mixed at a speed of 50 rpm (anker stirrer) and 1500 rpm (disperser) at 23° C. and at atmospheric pressure for 15 min. Subsequently, 180 g Aerosil 200 was added in 4 portions followed by 5 minutes mixing after each portion at 50 rpm (anker stirrer) and 1500 rpm (disperser) at a temperature of 30° C. and atmospheric pressure. The stirrer was then briefly stopped to remove all material adhering to the wall and upper parts of the mixer to reintroduce it into the vessel. The content of the vessel was mixed at 50 rpm (anker stirrer) and 1500 rpm (disperser) at 30° C. and 10 mbar for another 60 min. Then 1787 g of Apyral 60 D was added to the mixture. The contents of the vessel was again mixed at 50 rpm (anker stirrer) and 1500 rpm (disperser) at 30° C. and 10 mbar for 20 min. Finally the material was discharged.

Hardener Part: 1b

| Amount in grams | Components |
| --- | --- |
| 541.16 | Aradur ® HY 1235 |
| 12.0 | Accelerator DY 070 |
| 10.0 | BYK W 9010 |
| 20 | Aerosil ® R 202 |
| 200 | Apyral ® 60 D |
| 423.4 | Apyral ® 2E |
| 793.44 | Silbond ® W 12 EST |

Preparation Process for Hardener 541.16 g of Aradur HY 1235, 12 g Accelerator DY 070, 10 g Byk W 9010 are charged to a 2.5 l vessel, which can be heated and evacuated, and which is equipped with a mixer. The components are mixed at a speed of 30 rpm at 23° C. and atmospheric pressure for 10 min. Subsequently, 20 g of Aerosil R 202 are added and the components are mixed at 30 rpm at 23° C. and atmospheric pressure for 5 minutes. The stirrer was then briefly stopped to remove all material adhering to the wall and upper parts of the mixer and to reintroduce it into the vessel. The components are mixed with 30 rpm at 23° C. and atmospheric pressure for another 10 min. Subsequently, 200 g of Apyral 60 D is added to the mixture and mixing continued at 30 rpm at 23° C. and atmospheric pressure for 10 min. Then 423.4 g of Apyral 2E is added to the mixture and mixing continued at 30 rpm at 23° C. and atmospheric pressure for 10 min. Finally, the 793.44 g W12EST is charged to the mixer in 4 portions, stirring at 30 rpm, 23° C. and atmospheric pressure for 5 min each time before the next portion is added. After that, the composition is mixed at a speed of 30 rpm at 23° C. and atmospheric pressure for 25 min and then at 5 mbar for 10 min. Finally the material is discharged under nitrogen.

Processing of Resin and Hardener Part

The resin (1a) and hardener part (1b) of the example above are pumped via a meter mixing equipment at 23° C. in a mixing ratio of 1:1 by volume (corresponding to 100 parts by weight (pbw) resin and 155 pbw hardener) through a static mixer into the mold, preferably under vacuum of ca. 10 mbar. The mold can also be preheated to about 80° C. After filling the mold it was put to into an oven and cured for 1 hour at 120° C.

The final properties of cured resin are presented in Table 1.

Table 1 highlights some properties of a cured sample of Example 1 which are relevant for application in padding-free instrument transformers such as the high elongation at break (23° C.), which is an indication of the good crack resistance and the low E-modulus from tensile test (23° C.), which is an indication of the low stress on the encapsulated parts. The glass transition temperature of 15-25° C. shows that this material is at a semiflexible state at ambient temperature.

TABLE 1

| | | | |
| --- | --- | --- | --- |
| Tensile strength (23° C.) | ISO 527 | MPa | 10-15 |
| Elongation at break (23° C.) | ISO 527 | % | 30-50 |
| E modulus from tensile test (23° C.) | ISO 527 | MPa | 150-350 |
| Tensile strength (−25° C.) | ISO 527 | MPa | 30-50 |
| Elongation at break (−25° C.) | ISO 527 | % | 1.2-1.7 |
| E modulus from tensile test (−25° C.) | ISO 527 | MPa | 6000-7000 |
| Tensile strength (−40° C.) | ISO 527 | MPa | 40-60 |
| Elongation at break (−40° C.) | ISO 527 | % | 1.0-1.5 |
| E modulus from tensile test (−40° C.) | ISO 527 | MPa | 7300-8300 |
| Tensile strength (−50° C.) | ISO 527 | MPa | 45-65 |
| Elongation at break (−50° C.) | ISO 527 | % | 0.8-1.3 |
| E modulus from tensile test (−50° C.) | ISO 527 | MPa | 7400-8400 |
| Glass transition temperature (DSC) | ISO 11357-2 | ° C. | 15-25 |

Table 2 gives a comparison of basic features of three casting resins used for encapsulation of instrument transformers.

TABLE 2

| Features | Comparative Ex. 1 Rigid epoxy encapsulation material: e.g. Araldite ® HCEP; see Example 1 in WO 00/34388 | Comparative Ex. 2 Soft materials according to DE 37 02 782, e.g. Liquid silicone rubber | New Semiflexible hydrophobic cyclo epoxy according to Example 1 |
|---|---|---|---|
| Padding free possible | No | Yes | Yes |
| Bearing skeleton | Not necessary | Necessary | Not necessary |
| Cost of casting material | Reasonable | High | Reasonable |
| void-free coverage of metal | Can be critical (depending on padding) | OK | OK |
| bird pick resistance | Yes | No | Yes |
| salt fog test resistance | Good | Critical | Good |
| viscosity | Low | High | Very low |
| risk for partial discharge (due to bad impregnation) | Medium | Medium | Low |
| Measurement accuracy of instrument transformer with out padding | Not OK | OK | OK |

The invention claimed is:

1. An instrument transformer comprising an encapsulation material wherein the encapsulation material comprises (a) a cycloaliphatic epoxy resin, (b) a polyoxyalkylene diglycidylether (c) an OH-terminated polysiloxane, (d) a cyclic polysiloxane (e) a non-ionic, fluoroaliphatic surface-active reagent, (f) a filler, (g) an anhydride hardener, and (h) a curing accelerator and wherein the instrument transformer is padding-free.

2. The instrument transformer of claim 1, wherein the encapsulation material comprises, based on the total weight of the encapsulation material, (a) 3%-40% by weight of the cycloaliphatic epoxy resin, (b) 3%-40% by weight of the polyoxyalkylene diglycidylether, (c) 0.3%-10% by weight of the OH-terminated polysiloxane, (d) 0.3%-10% by weight of the cyclic polysiloxane, (e) 0.01%-1% by weight of the non-ionic, fluoroaliphatic surface-active reagent, (f) 1%-80% by weight of the filler, (g) 4%-25% by weight of the anhydride hardener, and (h) 0.1%-2% by weight of the curing accelerator.

3. The instrument transformer of claim 1, wherein the cycloaliphatic epoxy resin comprises hexahydrophthalic acid diglycidyl ester.

4. The instrument transformer of claim 3, wherein the encapsulation material further comprises an aliphatic epoxy resin.

5. The instrument transformer of claim 1, wherein the OH-terminated polysiloxane component (c) is a polysiloxane of formula I

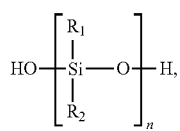

(I)

wherein $R_1$ and $R_2$ are each independently of the other $C_1$-$C_{18}$ alkyl, $C_5$-$C_{14}$ aryl or $C_6$-$C_{24}$ aralkyl and n is an average value of from 3 to 150.

6. The instrument transformer of claim 1, wherein the cyclic polysiloxane component (d) is a cyclic polysiloxane of formula II

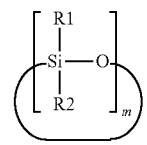

(II)

wherein $R_1$ and $R_2$ are each independently of the other $C_1$-$C_{18}$ alkyl, $C_5$-$C_{14}$ aryl or $C_6$-$C_{24}$ aralkyl and in is an integer from 3 to 12.

7. The instrument transformer of claim 6, wherein m ranges between 6 and 8.

8. The instrument transformer of claim 1, wherein the non-ionic, fluoroaliphatic surface-active reagent component (e) is a non-ionic, fluoroaliphatic surface-active reagent selected from a fluoroaliphatic ester, a fluoroaliphatic alkoxylated alcohol and a fluoroaliphatic sulfonamide.

9. A curable composition for an instrument transformer comprising (a) a cycloaliphatic epoxy resin, (b) a polyoxyalkylene diglycidylether (c) an OH-terminated polysiloxane, (d) a cyclic polysiloxane, (e) a non-ionic, fluoroaliphatic surface-active reagent, (f) a filler, (g) an anhydride hardener, (h) and a curing accelerator and wherein the instrument transformer is padding-free.

10. A process for encapsulating an instrument transformer comprising:
   (i) applying a curable composition comprising (a) a cycloaliphatic epoxy resin, (b) a polyoxyalkylene diglycidylether, (c) an OH-terminated polysiloxane, (d) a cyclic polysiloxane, (e) a non-ionic, fluoroaliphatic surface-active reagent, if a filler, (g) an anhydride hardener, and (h) a curing accelerator to the instrument transformer in a mold under the proviso that no padding is used between the applied curable composition and iron core of the transformer; and
   (ii) curing the curable composition.

11. A process for preparing an encapsulated padding-free instrument transformer comprising:
   a) heating a mold containing pre-assembled padding-free instrument transformer components to 60°-100° C. and evacuating the mold until a pressure of ca. 5 mbar-100 mbar is reached;

b) degassing a curable composition according to claim 9 in vacuum;
c) transferring the degassed curable composition into the mold;
d) releasing the vacuum in the mold to atmospheric pressure;
e) transferring the mold to a curing oven and heating the mold to a temperature of 80°-140° C. for 1 hour-10 hours; and
f) cooling the mold and releasing the encapsulated padding-free instrument transformer from the mold.

12. A process for preparing an encapsulated padding-free instrument transformer comprising:
a) heating pre-assembled padding-free instrument transformer components to a temperature of 80°-160° C.;
b) transferring the heated pre-assembled components to an automatic pressure gelation mold and heating the mold to a temperature of 100°-160° C.;
c) degassing a curable composition according to claim 9 under vacuum at a temperature between 20°-80° C.;
d) injecting the composition according to claim 9 into the mold;
e) applying a pressure of ca. 1 bar-5 bar after the mold is filled;
f) maintaining the mold at a pressure of between the 1 bar-5 bar to allow the curable composition to cure;
g) releasing the encapsulated padding-free instrument transformer from the mold; and optionally
h) transferring the encapsulated padding-free instrument transformer to a post cure oven for final cure.

13. An encapsulated padding-free instrument transformer obtained by a process according to claim 11.

14. An encapsulated padding-free instrument transformer obtained by a process according to claim 12.

* * * * *